United States Patent
Yamada et al.

(10) Patent No.: US 7,221,073 B2
(45) Date of Patent: May 22, 2007

(54) AXIAL GAP ELECTRONIC MOTOR

(75) Inventors: Shinichi Yamada, Kawasaki (JP);
Hisao Igarashi, Kawasaki (JP);
Tomonori Kojima, Kawasaki (JP);
Takayuki Shinohara, Kawasaki (JP);
Hidetaka Terakubo, Kawasaki (JP);
Tomohiro Kashiwagi, Kawasaki (JP);
Takushi Fujioka, Kawasaki (JP);
Yoichi Tanabe, Kawasaki (JP); Masaki Yamada, Kawasaki (JP)

(73) Assignee: Fujitsu General Limited, Kawasaki-Shi, Kanagawa-Ken (JP)

( * ) Notice: Subject to any disclaimer, the term of this patent is extended or adjusted under 35 U.S.C. 154(b) by 21 days.

(21) Appl. No.: 10/782,756

(22) Filed: Feb. 23, 2004

(65) Prior Publication Data

US 2004/0164641 A1    Aug. 26, 2004

(30) Foreign Application Priority Data

Feb. 26, 2003 (JP) ............... 2003-049012
Dec. 15, 2003 (JP) ............... 2003-416651

(51) Int. Cl.
*H02K 3/46* (2006.01)
*H02K 3/52* (2006.01)
*H02K 5/08* (2006.01)
*H02K 7/08* (2006.01)
*H02K 15/08* (2006.01)

(52) U.S. Cl. ..................... 310/218; 310/194
(58) Field of Classification Search ........ 310/216–218, 310/194, 254, 261, 267, 268; 336/234, 233, 336/212
See application file for complete search history.

(56) References Cited

U.S. PATENT DOCUMENTS

| | | | | |
|---|---|---|---|---|
| 4,095,150 | A * | 6/1978 | Senckel | 310/12 |
| 4,959,578 | A * | 9/1990 | Varga | 310/268 |
| 6,127,753 | A * | 10/2000 | Yamazaki et al. | 310/71 |
| 6,177,751 | B1 * | 1/2001 | Suzuki et al. | 310/269 |
| 6,369,687 | B1 * | 4/2002 | Akita et al. | 336/234 |
| 6,373,162 | B1 * | 4/2002 | Liang et al. | 310/156.53 |
| 6,445,105 | B1 * | 9/2002 | Kliman et al. | 310/268 |
| 6,573,632 | B2 * | 6/2003 | Hsu | 310/216 |
| 6,646,535 | B2 * | 11/2003 | Miyake et al. | 336/212 |
| 6,720,688 | B1 * | 4/2004 | Schiller | 310/64 |
| 6,809,453 | B2 * | 10/2004 | Narita et al. | 310/216 |
| 6,858,964 | B2 * | 2/2005 | Masumoto et al. | 310/216 |

* cited by examiner

*Primary Examiner*—Tran Nguyen
(74) *Attorney, Agent, or Firm*—Manabu Kanesaka

(57) ABSTRACT

An axial gap electronic motor includes a stator and a rotor disposed opposingly with a predetermined gap. In order to provide an easy assembling operation of the stator, the stator includes a plurality of pole members annularly connectable. The annular stator core is obtained by connecting each of the pole members to which coil winding is previously applied.

21 Claims, 11 Drawing Sheets

AXIAL GAP ELECTRONIC MOTOR

FIELD OF THE INVENTION

The present invention relates to an axial gap electronic motor including a stator and rotors which are each formed into substantially a disc shape, and disposed opposingly at the same rotary shaft with predetermined gaps, and more particularly, to an axial gap electronic motor having a stator which is assembled by a plurality of pole members.

BACKGROUND ART

An axial gap electronic motor is an electronic motor in which a pair of rotors is opposingly disposed in an axial direction at both sides of a disc-shaped stator with predetermined gaps, as shown in, for example, prior art example 1 (Japanese Patent Application Publication No. S60-128838). This axial gap electronic motor can be shortened in its length in the axial direction as compared with a radial gap electronic motor, and includes the advantage of being capable of making the electronic motor itself thin.

Incidentally, in the conventional axial gap electronic motor, a stator is formed by integrally molding an entire body including teeth and a bearing portion with a resin, after a bearing portion for a rotor output shaft is coaxially disposed in its inner circumferential portion, after a coil is wound around each groove of the teeth (iron core) formed into a ring shape.

However, the stator as in the above described prior art has the following problem in manufacturing. Namely, the teeth is in the ring shape, and therefore when the coils for three phases, for example, are wound around it, it is necessary to wind the coil of each phase every two layers while rotating the teeth. This requires introduction of a special, expensive and exclusive automatic winding machine.

It is necessary to bind a connecting wire of each phase by a binding band after the coil is wound around the teeth, but it is difficult to automate the operation, and therefore the operation is performed manually in the prior art. Accordingly, productivity is low, and reduction in cost by mass production cannot be attained.

For example, in prior art example 2, (Japanese Patent Application Publication No. 2000-253635) a ring-shaped ring spool and six small spools to be mounted to the ring spool are included, and a stator is easily assembled by mounting a first stator iron core and a second stator iron core, which are the result of dividing of a stator iron core into two, from both sides of the ring spool.

However, for example, in the method described in the prior art example 2, the coil is wound around the iron core after the iron core is assembled into the ring spool, and therefore not only the winding of the coil is complicated, but also the line diameter of the coil is limited.

Beside them, for example, prior art example 3 (Japanese Patent Application Publication No. H06-327208) discloses a stator structure of an axial gap electronic motor in which a plurality of stator blocks fixed with a resin are arranged concentrically along a space between an inner case and an outer case, but this prior art example does not have positioning means for accurately positioning the stators, and therefore positioning on fixing the stator with a resin is difficult.

As described in, for example, prior art example 4 (Japanese Patent Application Publication No. 2002-84698), the method, in which after the stator core is divided and connected in a bar shape, it is assembled to bend it in an annular shape, is generally performed in a radial gap motor. However, in an axial gap electronic motor, the method of forming the stator by dividing it into each tooth, and finally forming it in an annular shape is not found out yet.

SUMMARY OF THE INVENTION

The present invention is made to solve the aforementioned object, and its objects is to make it possible to perform an assembling operation of a stator thereof including a connecting wire settlement and the like efficiently in an axial gap electronic motor.

In order to attain the aforementioned object, the present invention is, in an axial gap electronic motor including a stator and a rotor each formed approximately in a disc shape and disposed opposingly at a same rotary shaft with a predetermined gap, characterized in that the above described stator comprises a plurality of pole members annularly connected, and each of the above described pole members comprises connecting means for connecting adjacent pole members.

The present invention is characterized in that each of the above described pole members has a stator iron core; a bobbin-shaped insulator including a pair of left and right flanges for winding a coil is integrally formed at the above described stator iron core; and the above described insulator is provided with connecting means for connecting each of the above described adjacent pole members.

As a preferable mode of the present invention, the above described flanges are formed to be larger than winding width of a coil which is wound around the above described insulator.

According to this, one stator is built by combining a plurality of pole members with each other, whereby as compared with the case in which the stator is integrally formed, assembling easiness, productivity and motor characteristics are all improved dramatically. By providing the insulator, not only winding easiness of the coil is increased, but also assembling easiness of the individual pole members is improved. The projection areas of the flanges are designed to be the same at the left and the right, whereby the number of wire windings can be fixed. Namely, flux distribution density per unit area can be made fixed, and a motor with small iron loss and cogging torque can be made. The winding width in the present invention means thickness in a winding direction of the coil.

The present invention is characterized in that a rotatable first engaging member comprising a combination of a boss and a bearing recessed portion for it, which are provided at outer circumferential sides (and/or inner circumferential sides), seen from a center of the above described stator, on an opposing surface of the above described flanges of the above described adjacent pole members, is included as the above described connecting means.

According to this, as the connecting means, the engaging member comprising the boss and the bearing recessed portion for it is engaged at the outer circumferential side and/or the inner circumferential side, seen from the center of the stator, of the opposing surfaces of the flanges of each of the adjacent pole members, whereby positioning can be performed easily.

The present invention is characterized in that the above described insulator comprises a single insulating material. According to this, all except for the tooth portion is built of the single material, whereby not only molding easiness and productivity are increased, but also recyclability after being recovered as a waste, for example, is remarkably increased.

As for a more preferable mode, the above-described insulator comprises at least two separate division parts, and each of the above described division parts is formed to sandwich the above-described stator iron core with each other. According to this, by dividing the insulator, they can be produced individually, and therefore productivity, cost, product quality can be improved as compared with the case in which it is designed to be integrated with the stator iron core.

The present invention is characterized in that a connecting wire support member for supporting a connecting wire laid between the pole members is integrally provided in at least one of the above-described flanges in each of the above-described pole members. As a more preferable mode, it is preferable that the above described connecting wire support member is provided to jut out to a side of the above described flange, and a connecting wire housing groove for catching the above described connecting wire is formed on the above described connecting wire support member.

According to this, settlement of the connecting wire can be performed at the same time. As for the preferable means for supporting the connecting wire, the connecting wire housing groove for catching the connecting wire is formed, and the connecting wire is laid along the groove to be housed therein.

As a further preferable mode of this, in at least part of the above described connecting wire housing groove, groove width of an opening is formed to be narrower than groove width of an inside so that the above described connecting wire cannot easily fall off, and more concretely, it is preferable that the above described connecting wire housing groove comprises a groove with an approximately C-shaped section.

According to this, so-called "return" is formed at an outlet and an inlet port portions of the housing groove, and therefore the connecting wire does not easily fall off from the connecting wire housing groove by the vibrations and the like during assembly and transportation. As a concrete shape, the groove with an approximately C-shaped section is preferable.

The present invention is characterized in that a number of said connecting wire housing grooves, which are provided, corresponds to at least a number of phases, and therefore the number of connecting wire housing grooves, which are provided, corresponds to at least the number of phases. According to this, coils of three-phases of U-phase, V-phase and W-phase can be wound around each of the stator cores in sequence, as, for example, a three-phase motor.

The present invention is characterized in that in a case in which at least two of the above described connecting wire housing grooves are provided at the above described connecting wire support member, one of the connecting wire housing grooves is disposed at an upper surface side of the above described connecting wire support member and the other connecting wire housing groove is disposed at a lower surface side of the above described connecting wire support member. According to this, danger of the connecting wires of different phases contacting each other and shorting out can be prevented.

As a more preferable mode, the above described connecting wire support member is provided with a twining portion around which a winding start end of a coil that is wound around the above described stator iron core and a winding terminal end of the coil are wound. As a further preferable mode, the above described twining portion has a first rod portion at a side of the winding start end of the above described coil and a second rod portion at a side of the winding terminal end of the above described coil, and a stopper with an extended diameter for preventing coil from falling off is formed at a head portion of each of the above described rod portions.

According to this, by winding the part of the coil around the twining portion, not only the length of the connecting wire can be optionally adjusted, but also the coil can be effectively prevented from getting loose during transportation, housing and the like.

As another mode, it is preferable that in a case in which at least two of the above described twining portions are provided at the above described connecting wire support member, one and the other of them are disposed at positions with different heights, and according to this, the coil of each phase can be prevented from contacting each other.

The present invention is characterized in that coil catching grooves, through which a part of the coil passing from the first rod portion at the side of the winding start end of the above described coil to an inside of the above described insulator and a part of the coil passing from the inside of the above described insulator to the second rod portion at the side of the winding terminal end of the above described coil are passed, are formed at an upper edge of the above described flange. According to this, the coil wound around can be smoothly guided to the twining portions from the insulator.

The present invention is characterized in that the above described stator iron core is provided with a skew inclined at a predetermined angle with respect to a rotating direction of the above described rotors. As a more preferable mode, an engaging member comprising a combination of a boss and a recessed portion as the above described connecting means is provided on opposing surfaces of the above described flanges of the above described each pole member. As a more concrete mode, it is preferable that the above described engaging member is provided at an inner circumferential side and/or an outer circumferential side seen from a center of the above described stator.

According to this, the pole members having skews at the teeth are connected annularly via the connecting means to be able to construct the stator structure, whereby not only the stator can be easily produced at low cost, but also cogging torque by the skews can be reduced.

The present invention is characterized in that a connecting wire housing groove for supporting a connecting wire laid between the pole members is integrally provided on a side surface of at least one of the above described flanges in the above described each pole member.

According to this, when each pole member is assembled and integrally fixed with a resin, the molten resin flows naturally on the side surface of the pole member, and therefore the molten resin can be uniformly spread entirely.

The present invention is characterized in that the above described connecting wire housing groove is made thinner at an open end portion than at the other portions. According to this, when the molten resin is poured, the thin-walled portion is softened by the heat, and holds the connecting wire inside to wrap it up, and therefore the connecting wire is further prevented from falling off.

As a more preferable mode, in a case in which the above described connecting wire housing grooves are placed side by side at two spots or more, the above described connecting wire housing grooves are placed so that height positions differs via a step portion, whereby flow of the resin becomes more smooth.

As a more preferable mode, the above described connecting wire housing groove is provided with catching grooves for catching part of the coil by hitching it, whereby the connecting wire can be prevented from loosening during transportation and assembly by hitching part of the connecting wire at the catching groove.

As a further preferable mode, in the above described connecting wire housing groove, an outer wall surface at an inner diameter side comprises a tapered plane inclined toward a radial direction, whereby flow of the resin can be further promoted.

The present invention is characterized in that resin introducing passages for enhancing flow of a resin when pole members are connected to each other and integrated by a synthetic resin material, are provided at part of the above described insulator. According to this, even if more or less irregularity exists on a side surface of the flange portions, the pole members can be integrated by pouring the molten resin reliably.

As a more preferable mode, a pair of the above described rotors is provided at a left and a right with the above described stator therebetween, whereby by constructing the insulator by dividing it, each of them only has to be produced individually, and therefore, the productivity, cost and production quality can be improved as compared with the case in which it is designed integrally with the stator iron core.

As a more concrete mode, in a case in which the above described pole member includes a stator iron core, the above described stator iron core has a pair of tooth portions opposing the above described rotors and a winding portion which is formed between the above described tooth portions and around which the above described coil is wound, and the above described tooth portions have same projection areas to a left and a right lamination areas with the above described winding portion between them.

According to this, the number of windings of the coil (the area of the coil per unit area) can be fixed. Namely, the flux distribution per unit area becomes the same, and therefore iron loss and cogging torque can be reduced.

DETAILED DESCRIPTION

Figure 1:
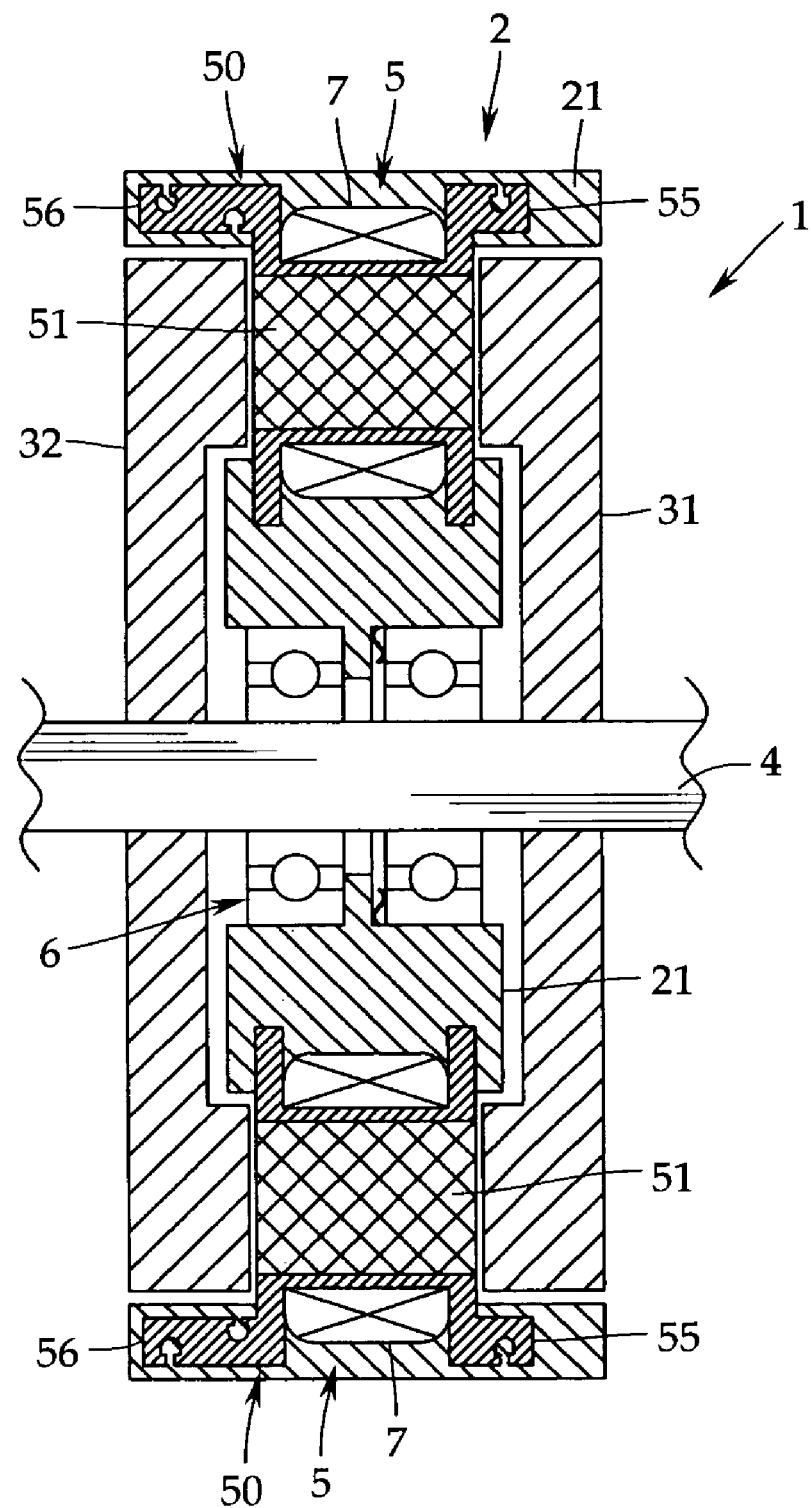
FIG. 1 is a schematic sectional view showing an internal structure of an axial gap electronic motor according to a first embodiment of the present invention.

This axial gap electronic motor 1 includes a stator 2 forming approximately a disc shape, a pair of rotors 31 and 32 opposingly disposed at both sides of the stator 2 with predetermined gaps. The rotors 31 and 32 share the same rotor output shaft 4 to be connected. The stator 2 includes a bearing portion 6 for supporting the rotor output shaft 4 in its inner circumferential side. A first embodiment is the case in which the present invention is applied to the axial gap electronic motor with 12 slots and 8 poles.

Actually, the stator 2, and the rotors 31 and 32 are housed in a bracket (housing) not shown, and the stator 2 is fixed to the bracket at its outer circumferential side. Accordingly, the rotors 31 and 32 are supported at the bracket via the rotor output shaft 4, the bearing portion 6 and the stator 2.

The stator 2 includes a stator core 5 formed into an annular shape (so-called a donut shape), and the bearing portion 6 coaxially inserted into an inner circumferential side of the stator core 5, and they are integrally molded by a synthetic resin 21. In this example, the bearing portion 6 includes two radial ball bearings, but the other bearing means may be adopted.

Figure 2:
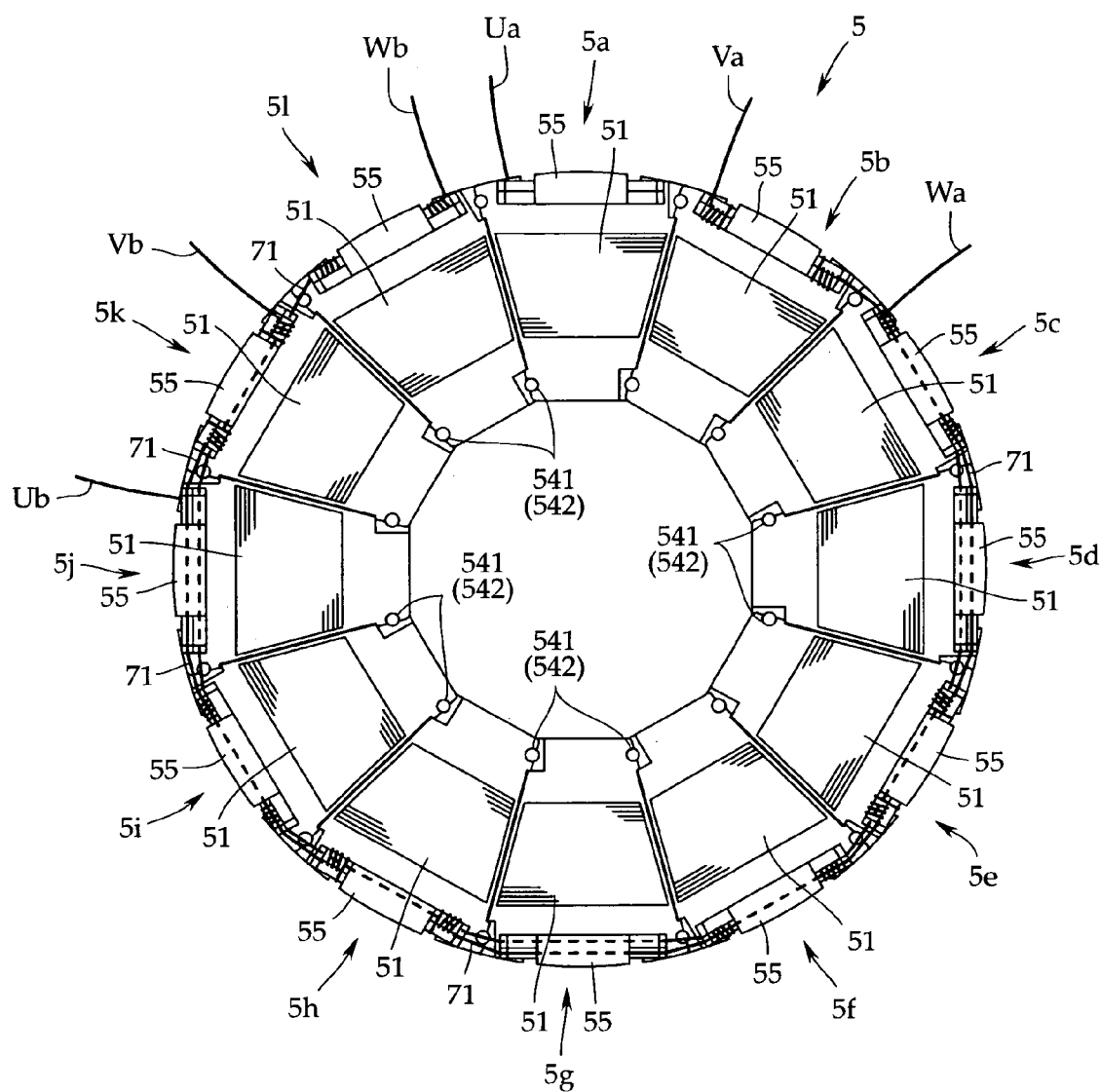
FIG. 2 is a side view showing a stator core which the axial gap electronic motor of the above described first embodiment includes.
Figure 3:
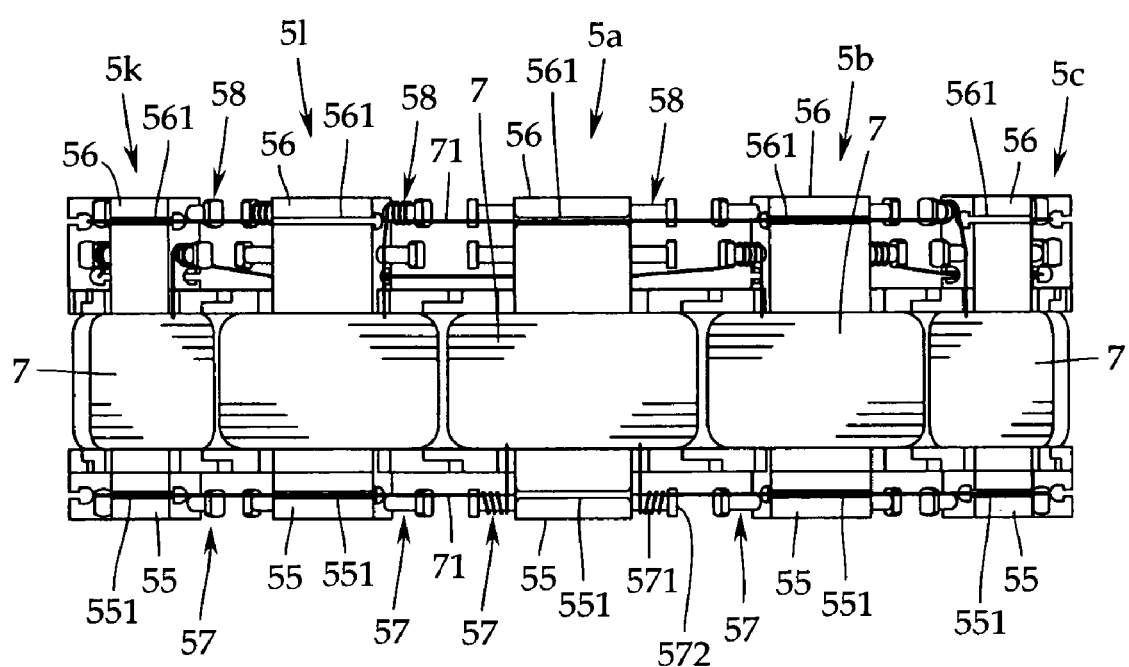
FIG. 3 is a plan view of the above described stator core.
Figure 4B:
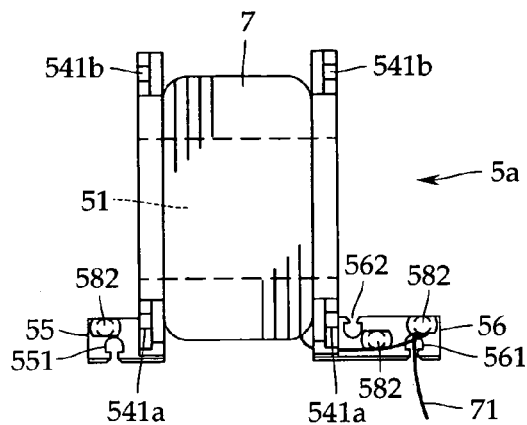
FIG. 4B is a plan view thereof.
Figure 4A:
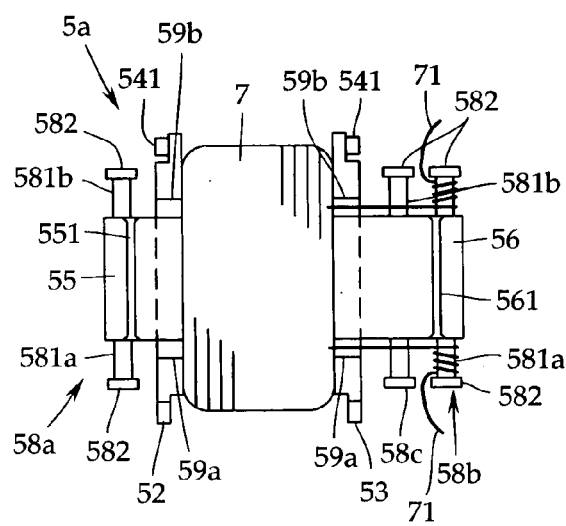
FIG. 4A is a front view of a pole member included in the above described stator core.
Figure 4D:
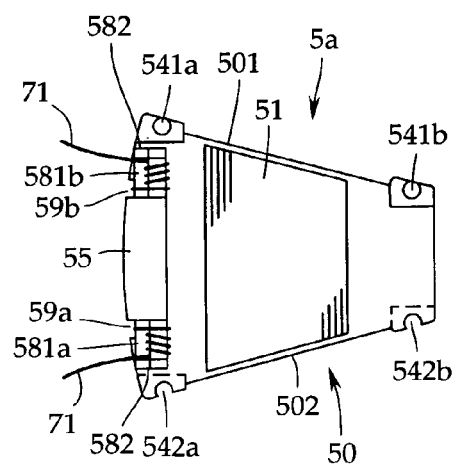
FIG. 4D is a bottom view thereof.
Figure 4C:
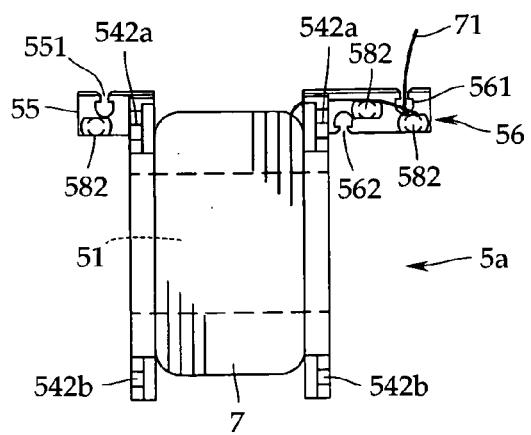
FIG. 4C is a right side view.

As shown in FIG. 2, the stator core 5 is constructed by connecting a plurality of (12 in this example) pole members 5a to 5l to be in an annular shape. Each of the pole members 5a to 5l is in the same shape, and in FIGS. 4A to 4D, one pole member 5a among them is extracted and shown.

The pole member 5a includes a tooth (iron core) 51 made by laminating a plurality of metallic plates in a trapezoidal shape, and around the tooth 51, an insulator 50 made of a synthetic resin is integrally formed except at both side surfaces thereof. The tooth 51 can be integrally molded by powder molding other than lamination.

The insulator 50 can be formed by insert molding which is performed by putting the tooth 51 into a cavity of a molding die not shown and injecting a molten resin into the cavity. In this embodiment, an SPS (syndiotactic-polystyrene) with comparatively favorable flowability is used as the molten resin.

In this embodiment, the stator iron core 51 is disposed at a center in each of the pole members 5a to 5l, but the structure of the present invention may be applied to a structure which does not have the stator iron core 51, namely, the pole members 5a to 5l in which so-called hollow core coils are adopted.

The entire insulator 50, which includes approximately sector-shaped flanges 52 and 53 disposed as a left and right pair along both side surfaces of the tooth 51, is formed into a bobbin shape with an H-shaped section. In this example, an angle of opening of each of the sector shapes of the flanges 52 and 53 is 30° (360°/12). With this insulator 50, a coil 7 can be wound around the tooth 51 regularly, and electrical insulation can be kept between the tooth 51 and the coil 7.

The flanges 52 and 53 are provided with connecting means for connecting the adjacent pole members to each other. In this example, two connecting means that are first and second connecting means are included in one pole member. The first connecting means is provided at an outer periphery side of a portion with larger width of each of the flanges 52 and 53, and the second connecting means is provided at an inner periphery side of a portion with smaller width thereof, in FIG. 4C.

The first connecting means includes boss 541a formed at an outer periphery side of one end edge 501 of each of the flanges 52 and 53, and an engaging groove 542a formed at an outer periphery side of the other end edge 502, and the second connecting means includes a boss 541b formed at an inner periphery side of the one end edge 501 of each of the flanges 52 and 53, and an engaging groove 542b formed at an inner periphery side of the other end edge 502.

The boss 541a of the first connecting means is engaged with the engaging groove 542a of the first connecting means at the side of the adjacent pole member, and the boss 541b of the second connecting means is engaged with the engaging groove 542b of the second connecting means at the side of the adjacent pole member.

In this example, both the bosses 541a and 541b are disposed at the side of the one end edge portion 501 of each of the flanges 52 and 53, and the engaging grooves 542a and 542b are both disposed at the side of the other end edge 502 of each of the flanges 52 and 53, but for example, the boss 541a of the side of the first connecting means may be disposed at the side of the other end edge 502, and the engaging groove 542a may be disposed at the side of the one end edge 501 by exchanging the positions of the boss and engaging groove.

It is preferable that the bosses 541a and 541b are cylindrical, and the engaging grooves 542a and 542b are, for example, C-shaped grooves having a little smaller openings than the diameters of the bosses so that each of the connecting means is capable of being engaged by a proper pressing force and allowing relative rotation in the engaged state.

The flanges 52 and 53 are provided with connecting wire support members 55 and 56 for settling a connecting wire 71 of the coil 7. The connecting wire support members 55 and 56 are formed to jut out to a side portion from an upper end portion of the outer periphery sides of the flanges 52 and 53. As a result, as each of the pole members 5a to 5l is connected in the annular shape, each of the connecting wire support members 55 and 56 is also disposed in the annular shape along the side surface of the stator core 2 (see FIG. 2).

In this example, the electronic motor has three phases, the connecting wire support member 55 at the side of the flange 52 takes charge of the connecting wire 71 of the coil 7 corresponding to one phase, and the connecting wire support member 56 at the side of the flange 53 takes charge of the connecting wire 71 of the coil 7 corresponding to the remaining two phases.

Consequently, the connecting wire support member 55 at the side of the flange 52 is provided with one connecting wire housing groove 551, and the connecting wire support member 56 at the side of the flange 53 is provided with two connecting wire housing grooves 561 and 562.

When, for example, the two connecting wire housing grooves 561 and 562 are provided as the connecting wire support member 56, it is preferable to place the one connecting wire housing groove 561 at the side of an upper surface of the connecting wire support member 56 and place the other connecting wire housing groove 562 at the side of a lower surface for the purpose of preventing tangle and erroneous insertion of the two connecting wires 71.

It is preferable that each of the connecting wire housing grooves 551, 561 and 562 is a groove which is large inside with a narrow inlet port, for example, a groove with an approximately C-shaped section so that the connecting wire 71 once inserted does not easily slip off.

The connecting wire support members 55 and 56 are provided with twining portions 58a to 58c for part of the connecting wire 71 to be wound around. The twining portions 58a to 58c are provided for the respective connecting wire housing grooves. Accordingly, in this example, the one twining portion 58a is provided corresponding to the connecting wire housing groove 551 at the side of the connecting wire support member 55, and the two twining portions 58b and 58c are provided corresponding to the connecting wire housing grooves 561 and 562 at the side of the connecting wire support member 56.

Each of the twining portions 58a to 58c includes a pair of rods 581a and 581b provided to protrude from both ends of the connecting wire support members 55 and 56 along a circumferential direction of the stator core 2, and a stopper 582 with a larger diameter than the diameter of the rod for preventing the connecting wire 71 wound around the rod from falling off is formed at a tip end portion of each of the rods 581a and 581b.

When, for example, the two twining portions 58b and 58c are provided as the connecting wire support member 56, it is preferable to place the one twining portion 58b and the other twining portion 58c at the positions with different heights to facilitate the winding operation for them.

Further, a pair of coil catching grooves 59a and 59b for catching both ends of the coil 7 wound along the tooth 51 are provided at an upper end of the outer periphery side of each of the flanges 52 and 53, whereby the connecting wire 71 can be settled without worrying about loosening of the coil 7 which is wound around.

Figure 5:
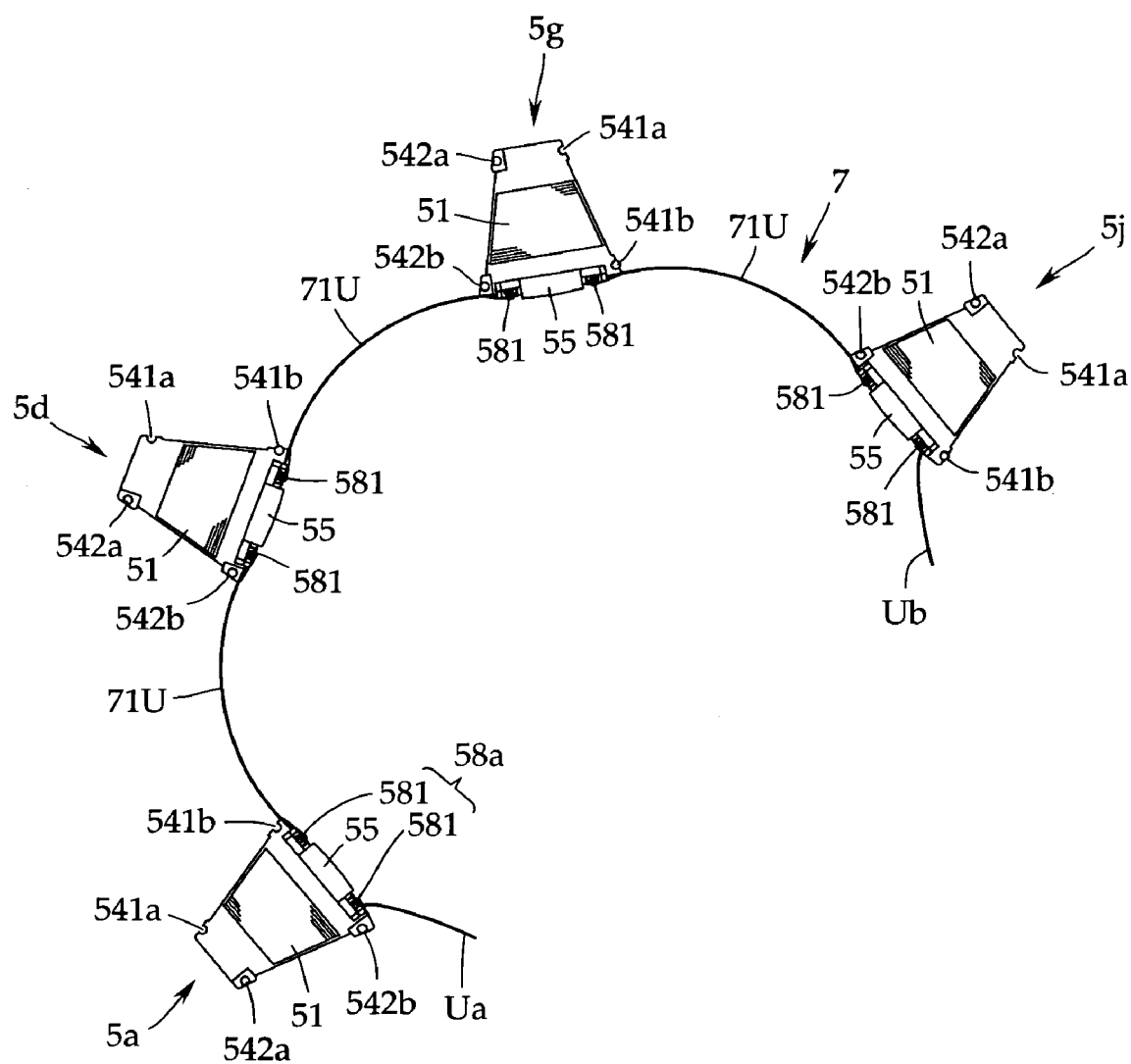
FIG. 5 is an explanatory view explaining an assembly procedure of the stator core.

Next, an example of an assembling procedure of the stator core 2 will be explained with reference to FIGS. 5 to 7. In this example, the electronic motor is a three-phase electronic motor, and therefore it is assumed that among the 12 pole members 5a to 5l shown in FIG. 2, for example, the pole members 5a, 5d, 5g and 5j are for U-phase, the pole members 5b, 5e, 5h and 5k are for V-phase, and the pole members 5c, 5f, 5i and 5l are for W-phase.

It is assumed that the connecting wire housing groove 551 of the one connecting wire support member 55 and the twining portion 58a are used for U-phase, the connecting wire housing groove 561 of the other connecting wire support member 56 and the twining portion 58b are used for V-phase, and the connecting wire housing groove 562 of the connecting wire support member 56 and the twining portion 58c are used for W phase.

The coil is wound for each phase by an automatic coil winding machine not shown, and the coil winding procedure is the same, and therefore only the U-phase will be explained here. As shown in FIG. 5, the coil 7 is wound from the side of, for example, the pole member 5a for the four pole members 5a, 5d, 5g and 5j for U-phase, as shown in FIG. 5.

Namely, a lead Ua of a predetermined length is secured, and a part of the coil 7 is wound around the one rod 581a of the twining portion 58a provided at the pole member 5a predetermined times. Thereafter, it is caught in the one coil catching groove 59a, introduced into the insulator 50, and wound around by a predetermined number of turns to form the coil 7.

Thereafter, a terminal end side of the coil 7 is caught in the other coil catching groove 59b to be guided to the other rod 581b and is wound around it predetermined times. A connecting wire 71 U corresponding to the length of that of two pole members is secured, and it proceeds to the next pole member 5d and forms the coil 7 with the same procedure as the above-described pole member 5a.

After the coil 7 is formed for the remaining pole member 5g, and the pole member 5j in the same manner, a leader Ub of a predetermined length is drawn from the side of the other rod 581b of the twining portion 58a of the final pole member 5j, whereby a coil winding operation for the U-phase is finished.

Similarly to the aforementioned procedure, the coils 7 are formed for the pole members 5b, 5e, 5h and 5k for V-phase, and for the pole members 5c, 5f, 5i and 5l for the W-phase while they are respectively connected with connecting wires 71V and 71W. In this case, the twining portion 58b at the outer side of the connecting wire support member 56 is used for the V-phase, and the twining portion 58c at the inner side thereof is used for the W-phase. It should be noted that reference symbols Va and Vb are leaders for the V-phase, and reference symbols Wa and Wb are leaders for the W-phase.

Figure 6:
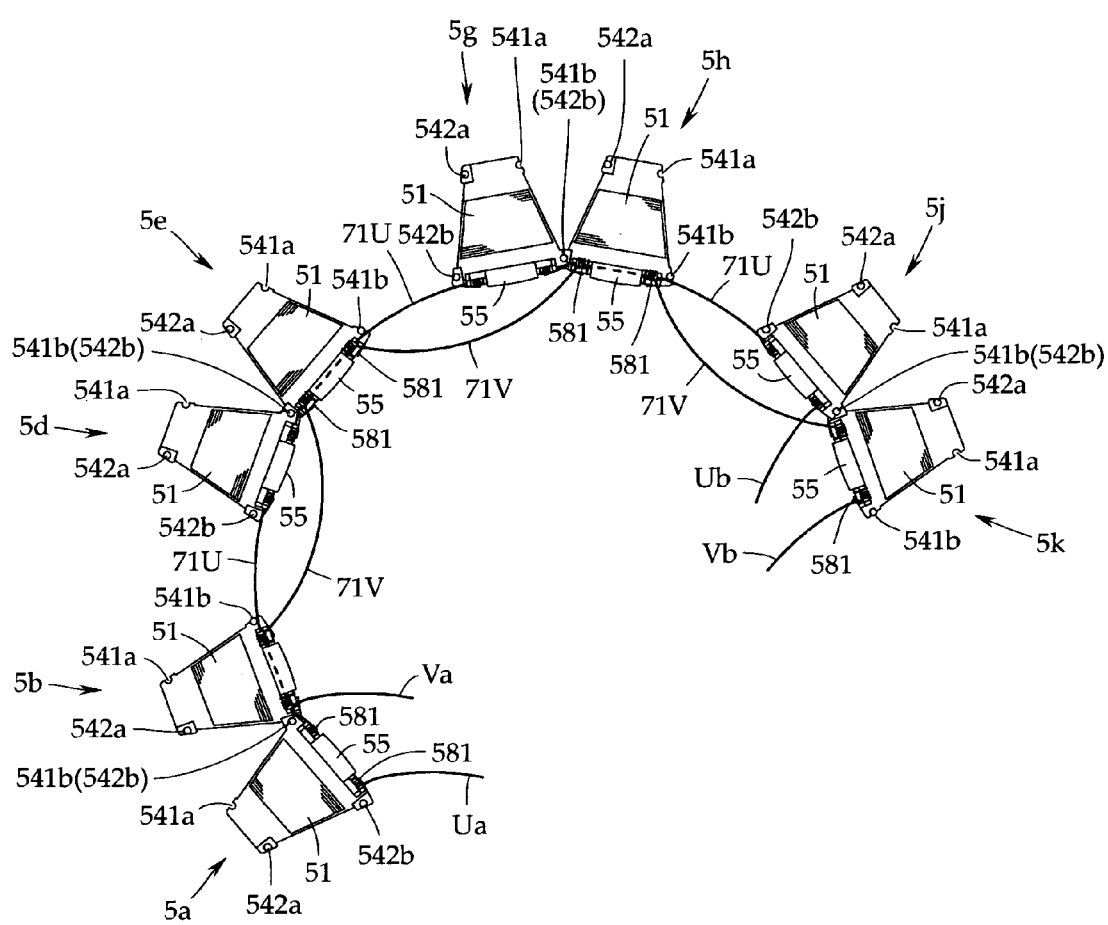
FIG. 6 is an explanatory view explaining the assembly procedure of the stator core.

After the pole member units for the three phases are formed in this way, as shown in FIG. 6, the pole members 5a, 5d, 5g and 5j for the U-phase which are connected with the connecting wires 71U are disposed in approximately an arc shape so that their outer periphery sides are at an inner side and their inner periphery sides are at an outer side, then the pole members 5b, 5e, 5h and 5k for the V-phase are disposed adjacently to each of the pole members 5a, 5d, 5g and 5j, and the pole members 5a and 5b, 5d and 5e, 5g and 5h , and 5j and 5k are connected by the bosses 541a and the engaging grooves 542a of their first connecting means.

Figure 7:
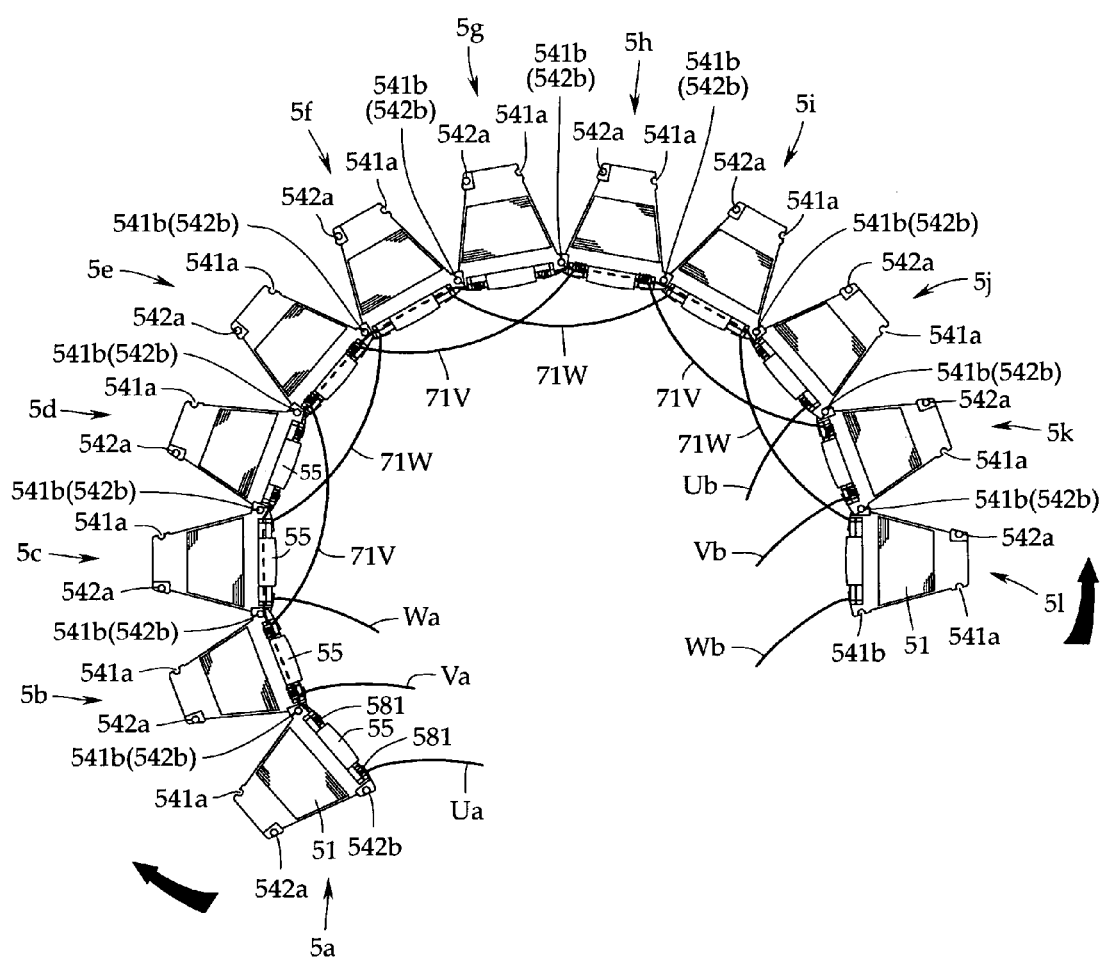
FIG. 7 is an explanatory view explaining the assembly procedure of the stator core.
Figure 8:
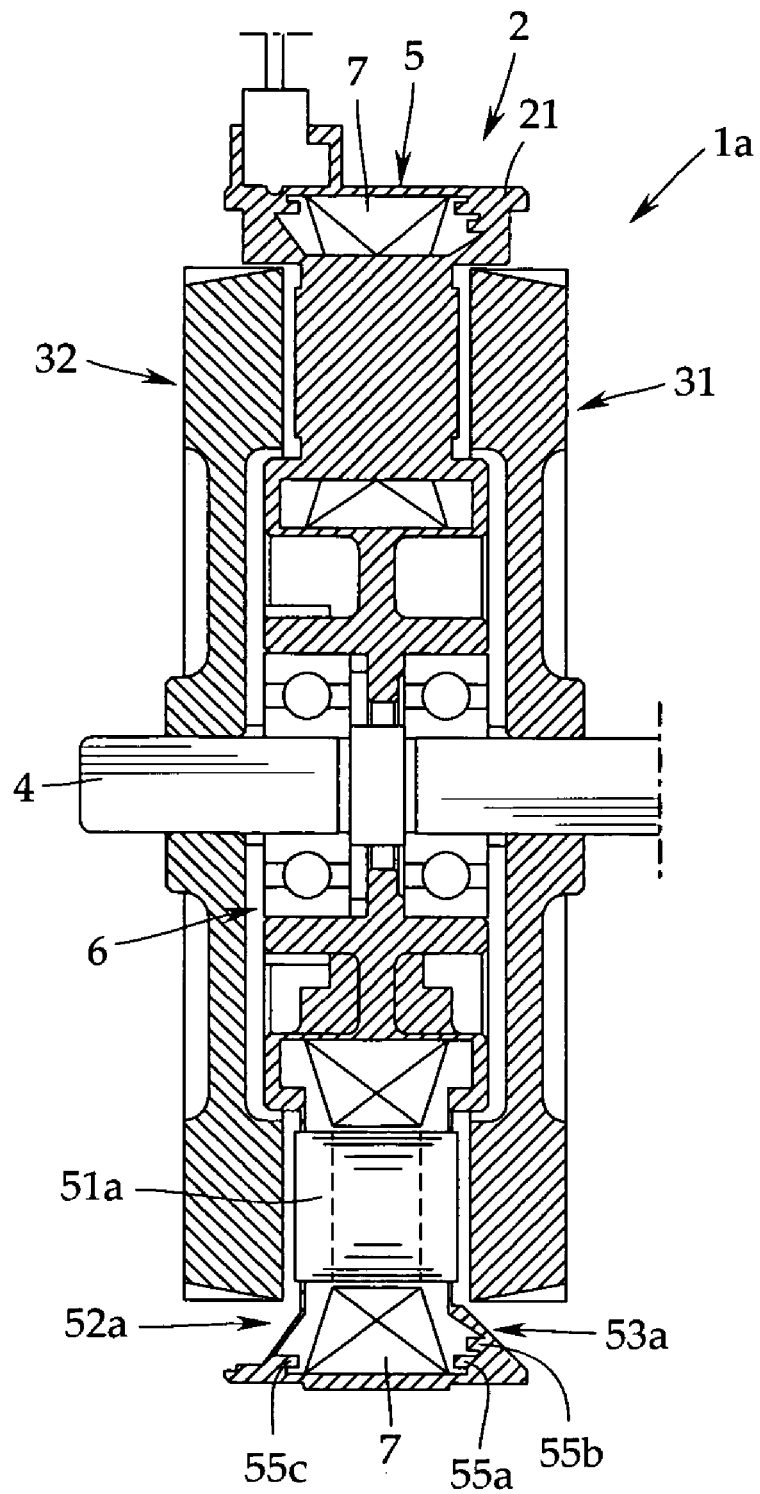
FIG. 8 is a schematic sectional view showing an internal structure of an axial gap electronic motor according to a second embodiment of the present invention.

Next, the pole members 5c, 5f, 5l and 5l for the W-phase are disposed in the unoccupied spaces between the pole members as shown in FIG. 6, and as shown in FIG. 7, each of the pole members 5c, 5f, 5i and 5l for the W-phase is connected to each of the pole members at both sides by the boss 541a and the engaging groove 542a at the first connecting means as described above.

After 12 pole members 5a to 5l are connected in this manner, the pole members 5a and 5l located at both ends are turned in the direction of the arrows in FIG. 7 so that their outer peripheries are at the outer side, and the pole members 5a and 5l are connected by the boss 541a and the engaging groove 542a at their first connecting means. The inner periphery of each of the pole members 5a to 5l are connected to each other by the boss 541b and the engaging groove 542b of the second connecting means.

As a result, the 12 pole members 5a to 5l are assembled annularly as shown in FIG. 2, and at this time, the connecting wires are settled at the same time. Namely, the connecting wires 71U of the U-phase are put into the connecting wire housing grooves 551 of the respective connecting wire support members 55 of the pole members 5b, 5c, 5e, 5f, 5h , 5i, 5k and 5l in the clockwise direction with the pole member 5a as a starting point, for example.

Similarly, the connecting wires 71V of the V-phase are put into the connecting wire housing grooves 561 of the respective connecting wire support members 56 of the pole members 5c, 5d, 5f, 5g, 5i, 5j, 5l and 5a in the clockwise direction with the pole member 5b as the starting point, for example. The connecting wires 71W of the W-phase are also put into the connecting wire housing grooves 562 of the respective connecting wire support members 56 of the pole members 5d, 5e, 5g, 5h , 5j, 5k , 5a and 5b with the pole member 5c as the starting point, for example.

Finally, after the bearing portion 6 is inserted in the inner circumferential side of the stator core 5, as shown FIG. 1, the outer periphery portion and the inner periphery portion of each pole member, and part of the bearing portion 6 in contact with the inner periphery portion are fixed by the synthetic resin 21 by insert molding.

Next, with reference to FIG. 8 to FIG. 12, an axial gap electronic motor according to a second embodiment will be explained. The portions which are the same or regarded as the same as those in the aforementioned first embodiment are given the same reference numerals and symbols, and the explanation thereof will be omitted. The second embodiment is the case in which the present invention is applied to an axial gap electronic motor with nine slots and eight poles.

This axial gap electronic motor 1a includes a stator 2 forming approximately a disc shape as in the above-described first embodiment, a pair of rotors 31 and 32 opposingly disposed at both sides of the stator 2 with a predetermined gap, the rotors 31 and 32 share the same rotor output shaft 4, and the stator 2 includes a bearing portion 6 for supporting the rotor output shaft 4 in its inner circumferential side. This axial gap electronic motor 1a is also housed in a bracket not shown.

The stator 2 includes a stator core 5 formed into an annular shape (donut shape), and the bearing portion 6 coaxially inserted into an inner circumferential side of the stator core 5, and they are integrally molded by a synthetic resin 21.

Figure 9:
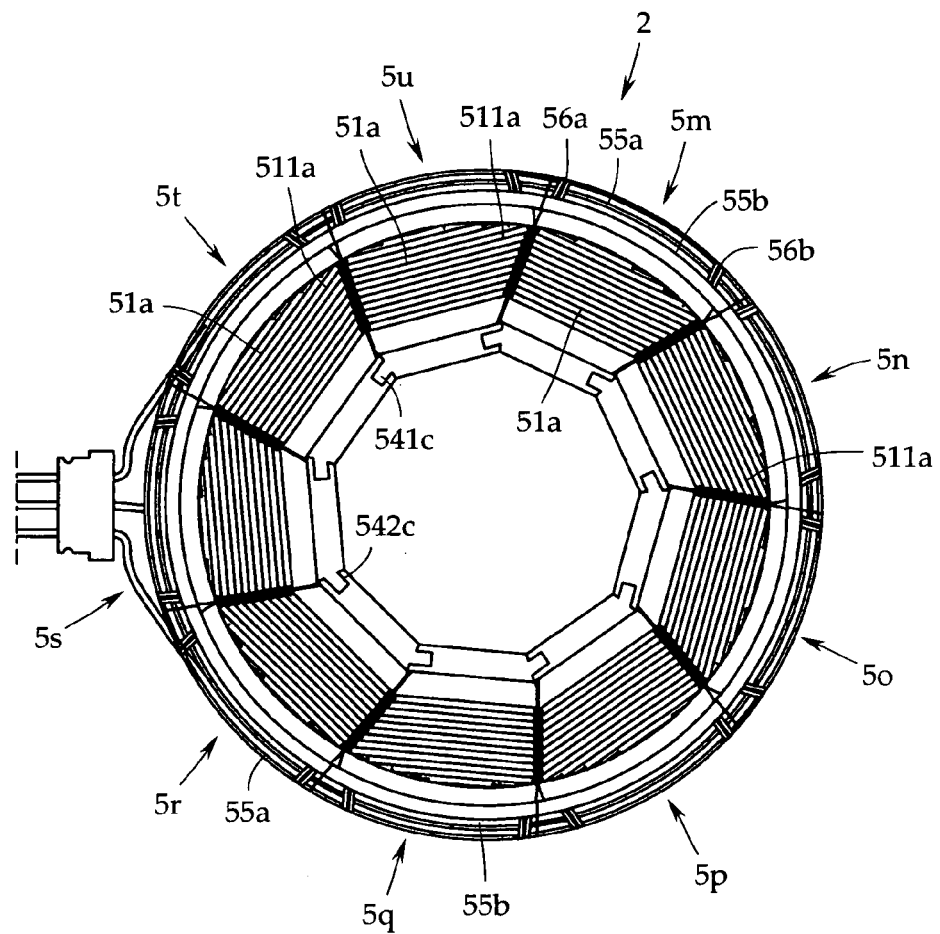
FIG. 9 is a side view showing a stator core which the axial gap electronic motor of the above described second embodiment includes.
Figure 10:
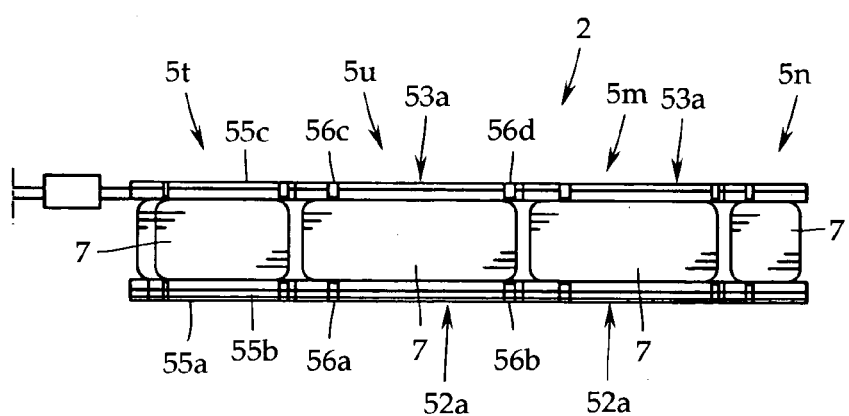
FIG. 10 is a plan view of the stator core of the above described second embodiment.
Figure 11B:
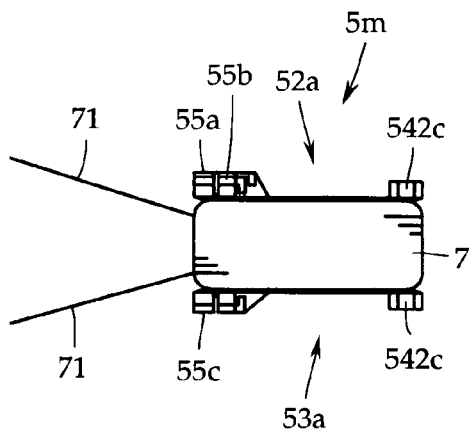
FIG. 11B is a plan view thereof.
Figure 11D:
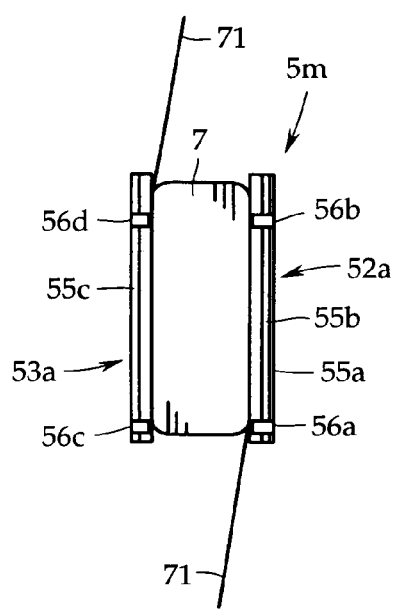
FIG. 11D is a bottom view.
Figure 11A:
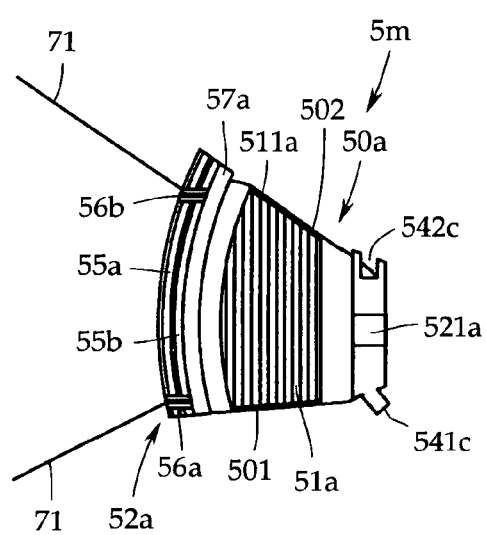
FIG. 11A is a front view of a pole member included in the stator core of the above described second embodiment.
Figure 11C:
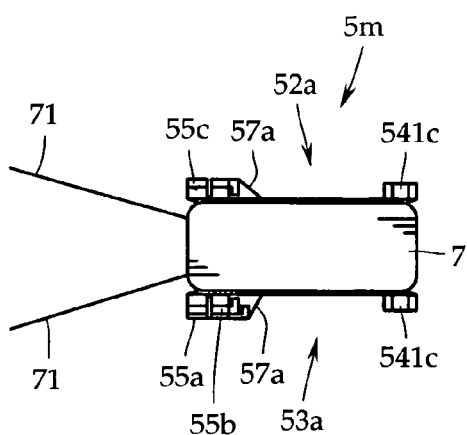
FIG. 11C is a right side view thereof.

As shown in FIG. 9, the stator core 5 is constructed by connecting a plurality of (corresponding to nine slots in this example) pole members 5m to 5u to be in an annular shape. Each of the pole members 5m to 5u is in the same shape, and in FIGS. 11A to 11D, one pole member 5m among them is extracted and shown.

The pole member 5m includes a tooth (iron core) 51a made by laminating a plurality of flat rolled magnetic steel sheets in a radial direction, and around the tooth 51a, an insulator 50a made of a synthetic resin is integrally formed except at both sides thereof. The tooth 51a may be integrally formed by powder molding or the like.

The insulator 50a can be formed by insert molding which is performed by putting the tooth 51a into a cavity in a molding die not shown and pouring a molten resin into the cavity. In this embodiment, an SPS (syndiotactic-polystyrene) with comparatively favorable flowability is also used as the molten resin.

In this embodiment, the insulator 50a is formed at the tooth 51a by insert molding, but, for example, the insulator 50a is constructed by two pieces in advance, and they may be mounted from both sides of the tooth 51a with the tooth 51 being sandwiched between them.

A skew 511a inclined at a predetermined angle along a rotating direction of the rotors 31 and 32, in the clockwise direction in this embodiment, is formed at the tooth 51a. In this embodiment, the skew angle is set at 5°, and according to this, occurrence of cogging torque can be restrained, thus improving energy conversion efficiency.

The skew 511a is formed in a linear shape with respect to a gap surface between the adjacent pole members, but it may be in an arc shape other than this shape, and the shape of the skew 511a is not especially limited if only the effect of restraining cogging torque effectively can be obtained.

The insulator 50a includes approximately sector-shaped flanges 52a and 53a disposed as a left and right pair along both side surfaces of the tooth 51a, and its entire body is formed into a bobbin shape with an H-shaped section. With the existence of the insulator 50a, a coil 7 can be regularly wound around the tooth 51a.

The flanges 52a and 53a are provided with connecting means for connecting the adjacent pole members to each other. In this example, connecting means is provided at inner periphery sides of the flanges 52a and 53a.

The connecting means is constituted of a boss 541c formed at an inner periphery side of one end edge 501 of each of the flanges 52a and 53a, and an engaging groove 542c formed at an inner periphery side of the other end edge 502, and they are engaged with each other, whereby the annular stator core 5 as shown in FIG. 9 is formed.

In this embodiment, the boss 541c and the engaging groove 542c are constituted of a rectangular column body and a corresponding rectangular groove, and by engaging them with each other, they are also used as positioning means for the skew 511a.

Connecting wire housing grooves 55a to 55c for settling connecting wires 71 of the coil 7 are provided at three spots on side surfaces of the flanges 52a and 53a. In this embodiment, the connecting wire housing grooves 55a to 55c are respectively formed into an arc shape on the side surfaces of the flanges 52a and 53a along the outer periphery side, the two connecting wire housing grooves 55a and 55b are formed on the one flange 52a and the remaining connecting wire 55c is formed on the other flange 53a.

Figure 12:
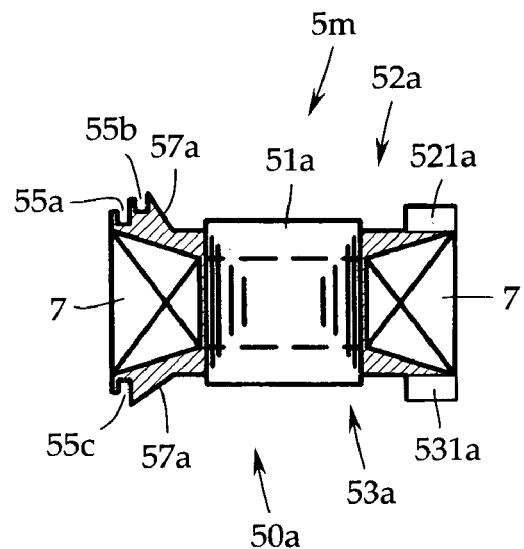
FIG. 12 is a sectional view of the pole member of the above described second embodiment.

As shown in FIG. 12, each of the connecting wire housing grooves 55a to 55c is constituted of a U-shaped groove, but more preferably, the groove width of an opening is designed to be the same as or smaller than the groove width of the inside. According to this, the effect of preventing the connecting wire 71 from slipping off can be obtained.

It is preferable that each of the connecting wire housing grooves 55a to 55c has its tip end portion (open end side) made thinner as compared with the other portions. According to this, when each of the pole members 5m to 5u is integrated by the synthetic resin 21 after being connected, heat of the molten resin penetrates to the tip end portion, whereby the tip end portion is softened and wraps the connecting wire 71 housed inside, and thus the effect of preventing the connecting wire 71 from slipping off is further enhanced.

When the connecting wire housing grooves 55a to 55c are provided side by side at two or more spots, namely, the connecting wire housing grooves are placed as the connecting wire housing grooves 55a and 55b shown in FIG. 12, the connecting wire housing grooves 55a and 55b are placed so that the height positions differ from each other via a step portion. The height position in this embodiment means the height in the axial direction.

In this embodiment, the connecting wire housing groove 55a at the outer periphery side is formed to be lower by one step than the connecting wire housing groove 55b at the inner periphery side. According to this, the molten resin smoothly flows inside a mold cavity, and therefore the molten resin can be poured into the mold cavity without forming clearances (voids) or the like between the stator core 2 and the synthetic resin 21.

It is preferable that each of outer wall surfaces 57a at the inner periphery side of the connecting wire housing grooves at the inner diameter side (the connecting wire housing grooves 55b and 55c in this embodiment) among the connecting wire housing grooves 55a to 55c is constituted of a tapered plane inclined toward the radial direction. According to this, the molten resin poured from the center to the outer perimeter side can be flown to the outer periphery side more smoothly.

Further, as the means for making the molten resin flow more easily, resin introducing passages 521a and 531a, which enhance the flow of the resin when the pole members 5m to 5u are connected and integrated, are provided at parts of the flanges 52a and 53a. The resin introducing passages 521a and 531a are constituted of a channel-shaped grooves formed at the inner diameter sides of the flanges 52a and 53a along the radial direction, and from them, the molten resin flows into the outer periphery portion through the side surfaces of the flanges 52a and 53a.

In this embodiment, the resin introducing passage 521a and 531a are provided at only one spot along the radial direction of the inner periphery side of each of the flanges 52a and 53a, but the resin introducing passages may be provided at, for example, a plurality of spots, and the number and the shape of them are not especially limited.

The connecting wire housing grooves 55a to 55c are respectively provided with catching grooves 56a to 56d notched along the radial direction. The catching grooves 56a to 56d are provided at two spots at each of the connecting wire housing grooves 55a to 55c, and by catching part of the connecting wire 71 by them, the connecting wire 71 is prevented from being disengaged during transportation or the like.

Assembly and wire connection procedure of each of the stator cores 5m to 5u is basically the same as the aforementioned first embodiment, but in the case of a nine slot type, it is necessary to dispose the U, V and W phases in the order of (+)→(−)→(+), and therefore it is necessary to reverse the winding direction of the middle stator cores, or to connect the connecting wire reversely.

After assembling the stator cores 5m to 5u, they are formed as the stator 2 by performing insert molding by the synthetic resin 21. The resin in the molten state is usually poured into the cavity from the center of the stator 2, and flown toward the outer periphery side, but in the second embodiment, the design to make the flow of the molten resin smooth is made by forming the connecting wire housing grooves 55a to 55c on the side surfaces of the flanges 52a and 53a, by providing the tapered plane, and the like, and therefore the stator 2 with more uniform quality can be obtained.

When each of the pole members is fixed permanently by the synthetic resin 21 finally as in the above, the second connecting means provided at the inner periphery side of each of the pole members are not necessarily needed. In the above-described example, a pair of rotors 31 and 32 are included, but one side rotor may be used. Like this, the present invention includes various modifications within the scope without deviating the spirit of the present invention and within the range which is considered to be technically equivalent.

Figure 13A:
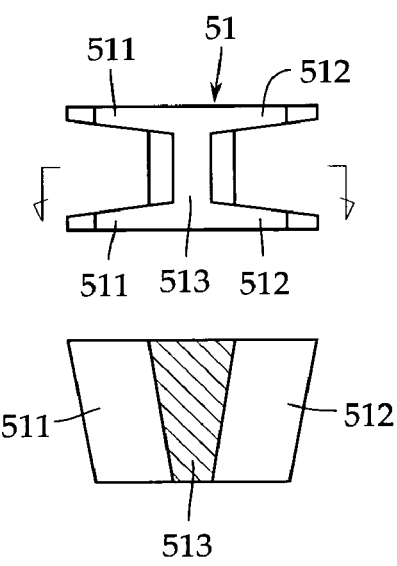
FIG. 13A and FIG. 13B are explanatory views explaining structures of stator iron cores of the above described first and second embodiments.
Figure 13B:
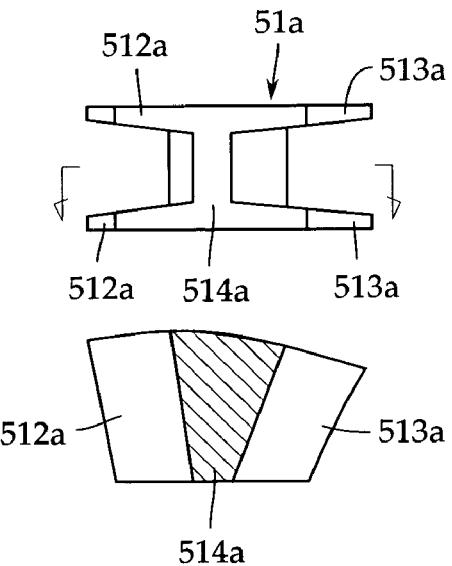

It is preferable that in the stator iron core 51 incorporated in each of the pole members 5a to 5l (the first embodiment), and 5m to 5u, the projection areas of the flanges 511 (512) and 512a (513a) to the plane orthogonal to the lamination direction are the same at the left and the right irrespective of the presence and absence of the skew, as shown in FIGS. 13A and 13B.

Namely, as shown in FIG. 13A, the projection areas of the flanges 511 and 522 formed at the left and the right with the winding portion 513 at the center between them are laterally symmetrical in the case without the skew.

As shown in FIG. 13B, when the skew 511a is formed in a gap of the tooth 51a, part of the winding portion 514a is formed to jut out to the side of the flange 513a, whereby each of the projection areas of the left and right flange portions 512a and 513a to the orthogonal plane to the lamination direction is formed to be the same.

According to this, the areas become the same, and therefore the winding wire can be housed uniformly without extending off the pole member. Since the winding wire does not extend off the pole member, the pole members can be disposed without interfering with each other.

In the case without having the stator iron core 51, the same effect can be obtained by making the projection areas of the flange portions 52a and 53a, which are formed at each of the insulators 5a to 5u, the same.

According to this axial gap electronic motor, the connecting wire 71 is settled easily, whereby favorable assembling performance is obtained and productivity is enhanced. Degree of flexibility of design in the specification and winding of the coil is high, and highly efficient motor can be obtained. Furthermore, each part is integrally assembled, and thereby the motor can be produced at lower cost.

The invention claimed is:

1. An axial gap electronic motor comprising a stator and a rotor each formed approximately in a disc shape and disposed opposingly at a same rotary shaft with a predetermined gap, wherein said stator comprises a plurality of pole members annularly connected, each of said pole members having a stator iron core, an insulator for winding a coil, said insulator being integrally formed with the stator iron core as one unit and having connecting means for connecting adjacent pole members, and a coil wound around the insulator, and wherein said insulator has a bobbin shape including a pair of left and right flanges, and said connecting means comprises first connecting means and second connecting means formed at outer and inner periphery sides of the respective flanges of the insulator when viewed from a center of the stator.

2. The axial gap electronic motor according to claim 1, wherein said flanges are formed to be larger than winding width of the coil wound around said insulator.

3. The axial gap electronic motor according to claim 1, wherein said stator iron core is provided with a skew inclined at a predetermined angle with respect to a rotating direction of said rotor.

4. The axial gap electronic motor according to claim 1, wherein a pair of rotors is provided at a left and a right with said stator therebetween.

5. The axial gap electronic motor according to claim 1, wherein said stator iron core and said insulator form said one unit integrally joined and fixed together without separation.

6. An axial gap electronic motor comprising a stator and a rotor each formed approximately in a disc shape and disposed opposingly at a same rotary shaft with a predetermined gap, wherein said stator comprises a plurality of pole members annularly connected, each of said pole members having a stator iron core, an insulator for winding a coil, said insulator being integrally formed with the stator iron core as one unit and having connecting means for connecting adjacent pole members, and a coil wound around the insulator, and wherein a connecting wire support member for supporting a connecting wire to be laid between the pole members is integrally provided in at least one of said flanges in each of said pole members.

7. The axial gap electronic motor according to claim 6, wherein said connecting wire support member is provided to jut out to a side of said flange.

8. The axial gap electronic motor according to claim 6, wherein a connecting wire housing groove for catching said connecting wire is formed on said connecting wire support member.

9. The axial gap electronic motor according to claim 8, wherein in at least part of said connecting wire housing groove, groove width of an opening is formed to be narrower than groove width of an inside so that said connecting wire cannot easily fall off.

10. The axial gap electronic motor according to claim 9, wherein said connecting wire housing groove has an approximately C-shaped section.

11. The axial gap electronic motor according to claim 8, wherein a number of said connecting wire housing grooves corresponds to at least a number of phases.

12. The axial gap motor according to claim 8, wherein in a case in which at least two of said connecting wire housing grooves are provided at said connecting wire support member, one of the connecting wire housing grooves is disposed at an upper surface side of said connecting wire support member and the other connecting wire housing groove is disposed at a lower surface side of said connecting wire support member.

13. The axial gap electronic motor according to claim 6, wherein said connecting wire support member is provided with a twining portion around which a winding start end and a winding terminal end of the coil wound around said stator iron core are wound.

14. The axial gap electronic motor according to claim 13, wherein said twining portion has a first rod portion at a side of the winding start end of said coil and a second rod portion at a side of the winding terminal end of said coil, and a stopper with an extended diameter for preventing the coil from falling off is formed at a head portion of each of said rod portions.

15. The axial gap electronic motor according to claim 13, wherein in a case in which at least two of said twining portions are provided at said connecting wire support member, said twining portions are disposed at positions with different heights.

16. The axial gap electronic motor according to claim 14, wherein coil catching grooves, for passing a part of the coil passing from the first rod portion at the side of the winding start end of said coil to an inside of said insulator and a part of the coil passing from the inside of said insulator to the second rod portion at the side of the winding terminal end of said coil, are formed at an upper edge of said flange.

17. An axial gap electronic motor comprising a stator and a rotor each formed approximately in a disc shape and disposed opposingly at a same rotary shaft with a predetermined gap, wherein said stator comprises a plurality of pole members annularly connected, each of said pole members having a stator iron core, an insulator for winding a coil, said insulator being integrally formed with the stator iron core as one unit and having connecting means for connecting adjacent pole members, and a coil wound around the insulator, and wherein said connecting means includes a rotatable engaging member comprising a combination of a boss formed on one side face of a flange of the insulator and a bearing recessed portion formed on a side face of a flange of another pole member opposite thereto.

18. An axial gap electronic motor comprising a stator and a rotor each formed approximately in a disc shape and disposed opposingly at a same rotary shaft with a predetermined gap, wherein said stator comprises a plurality of pole members annularly connected, each of said pole members having a stator iron core, an insulator for winding a coil, said insulator being integrally formed with the stator iron core as one unit and having connecting means for connecting adjacent pole members, and a coil wound around the insulator, and wherein resin introducing passages for enhancing flow of a resin when the pole members are integrally connected to each other by the resin, are provided at part of said insulator.

19. An axial gap electronic motor comprising a stator and a rotor each formed approximately in a disc shape and disposed opposingly at a same rotary shaft with a predetermined gap, wherein said stator comprises a plurality of pole members annularly connected, each of said pole members having a stator iron core, an insulator for winding a coil, said insulator being integrally formed with the stator iron core as one unit and having connecting means for connecting adjacent pole members, and a coil wound around the insulator, and wherein said stator iron core has a pair of tooth portions opposing said rotor and a winding portion formed between said tooth portions for winding said coil therearound, and said tooth portions have same projection areas to a left and a right lamination areas with said winding portion therebetween.

20. An axial gap electronic motor comprising a stator and a rotor each formed approximately in a disc shape and disposed opposingly at a same rotary shaft with a predetermined gap, wherein said stator comprises a plurality of pole members annularly connected, and wherein each of said pole members has a stator iron core, and a bobbin-shaped insulator including a pair of left and right flanges for winding a coil and formed around said stator iron core, and said insulator is provided with connecting means for connecting each of said adjacent pole members, wherein said connecting means includes at least one of a rotatable first engaging member and a rotatable second engaging member, said first engaging member comprising a combination of a boss and a bearing recessed portion therefor, said boss and recessed portion being provided at outer periphery sides, seen from a center of said stator, on opposing surfaces of said flanges of said adjacent pole members, and said second engaging member comprising a combination of a boss and a bearing recessed portion therefor, said boss and bearing recessed portion of the second engaging member being provided at inner circumferential sides, seen from the center of said stator, on the opposing surfaces of said flanges of said adjacent pole members.

21. An axial gap electronic motor comprising a stator and a rotor each formed approximately in a disc shape and disposed opposingly at a same rotary shaft with a predetermined gap, wherein said stator comprises a plurality of pole members annularly connected, and wherein each of said pole members has a stator iron core, and a bobbin-shaped insulator including a pair of left and right flanges for winding a coil and formed around said stator iron core, and said insulator is provided with connecting means for connecting each of said adjacent pole members, wherein a connecting wire support member for supporting a connecting wire to be laid between the pole members is integrally provided in at least one of said flanges in each of said pole members, and wherein a connecting wire housing groove for catching said connecting wire is formed on said connecting wire support member.

* * * * *